(12) United States Patent
Mitchell et al.

(10) Patent No.: US 8,833,434 B2
(45) Date of Patent: Sep. 16, 2014

(54) PT NANOTUBES

(75) Inventors: James Mitchell, Bloomfield, NY (US); Timothy J. Fuller, Pittsford, NY (US); Lijun Zou, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 13/492,392

(22) Filed: Jun. 8, 2012

(65) Prior Publication Data
US 2013/0327494 A1 Dec. 12, 2013

(51) Int. Cl.
*B22D 25/02* (2006.01)
*B22C 9/00* (2006.01)

(52) U.S. Cl.
USPC ............... 164/520; 164/6; 164/522; 164/526; 75/633; 75/631; 75/772; 502/100; 502/300; 502/339

(58) Field of Classification Search
None
See application file for complete search history.

(56) References Cited

U.S. PATENT DOCUMENTS

2010/0172066 A1 * 7/2010 Baer et al. .................. 361/323

FOREIGN PATENT DOCUMENTS

JP 2012028421 * 9/2012

* cited by examiner

*Primary Examiner* — Melvin C Mayes
*Assistant Examiner* — Colette Nguyen
(74) *Attorney, Agent, or Firm* — Brooks Kushman P.C.

(57) ABSTRACT

A method for making hollow metal tubes includes a step combining a polyphenylene sulfide-containing resin with a water soluble carrier resin to form a resinous mixture. The resinous mixture is then extruded to form an extruded resinous mixture. The extruded resinous mixture includes polyphenylene sulfide-containing fibers within the carrier resin. The extruded resinous mixture is contacted (i.e., washed) with water to separate the polyphenylene sulfide-containing fibers from the carrier resin. The polyphenylene sulfide-containing fibers are then coated with a metal layer. The hollow metal tubes are then formed by removing the polyphenylene sulfide-containing fibers.

20 Claims, 8 Drawing Sheets

PT NANOTUBES

The present invention relates to methods for making hollow metal nanotubes.

BACKGROUND OF THE INVENTION

The creation of hollow metallic tubes is an area of highly active research. Improved methods of forming hollow metallic micro and nano tubes is being actively pursued in the fields of electronics, sensors, bio-medical, fuel cell and battery development.

In the case of proton exchange membrane type fuel cells, hydrogen is supplied to the anode as fuel, and oxygen is supplied to the cathode as the oxidant. The oxygen can either be in pure form ($O_2$) or air (a mixture of $O_2$ and $N_2$). Proton exchange membrane ("PEM") fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid (PFSA) ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive flow field elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer (PFSA). For example, PFSA is typically added to the Pt/C catalyst ink in electrode layer fabrication of proton exchange membrane fuel cells to provide proton conduction, to the dispersed Pt-carbon catalyst nanoparticles as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

Although the current technologies for making the electrode layers work reasonably well, there is still a need for improvement. For examples, platinum nanotubes are currently being investigated for fuel cell electrode applications to augment electrode conductivity.

Accordingly, the present invention provides improved methods of making porous pads of platinum nanotubes that are useful in fuel cell applications.

SUMMARY OF THE INVENTION

The present invention solves one or more problems of the prior art by providing in at least one embodiment a method for making hollow metal tubes. The method includes a step combining a polyphenylene sulfide-containing resin with a water soluble carrier resin to form a resinous mixture. The resinous mixture is then extruded to form an extruded resinous mixture. The extruded resinous mixture includes polyphenylene sulfide-containing fibers within the carrier resin. The extruded resinous mixture is contacted (i.e., washed) with water to separate the polyphenylene sulfide-containing fibers from the carrier resin. The polyphenylene sulfide-containing fibers are then coated with a metal layer. The hollow metal tubes are then formed by removing the polyphenylene sulfide-containing fibers.

In another embodiment, a method of making hollow platinum tubes is provided. The method includes a step combining a polyphenylene sulfide-containing resin with a water soluble carrier resin to form a resinous mixture. The resinous mixture is then extruded to form an extruded resinous mixture. The extruded resinous mixture includes polyphenylene sulfide-containing fibers within the carrier resin. The extruded resinous mixture is contacted (i.e., washed) with water to separate the polyphenylene sulfide-containing fibers from the carrier resin. The polyphenylene sulfide-containing fibers are then coated with a platinum layer. The hollow platinum tubes are then formed by removing the polyphenylene sulfide-containing fibers.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refer to weight average molecular weight unless otherwise indicated; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
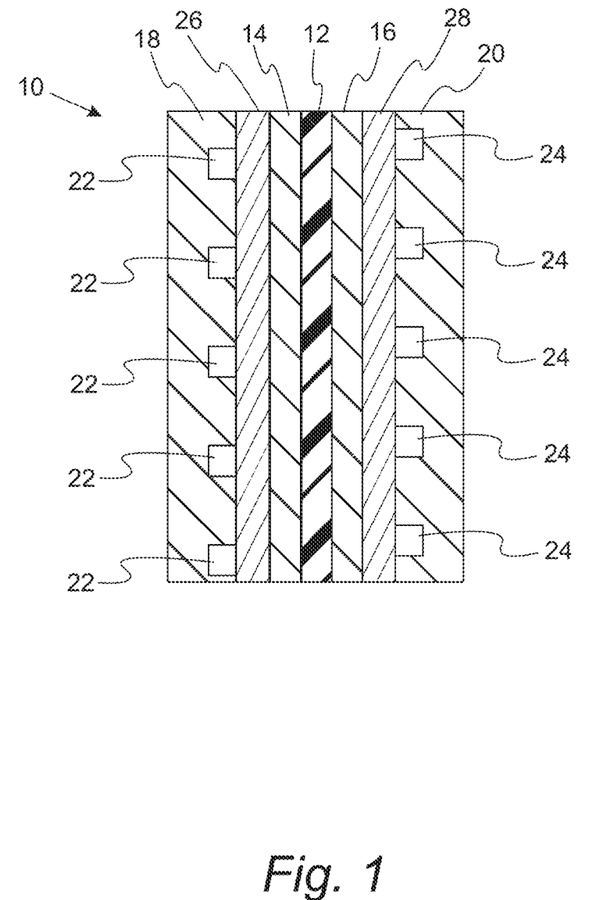
FIG. 1 provides a schematic illustration of a fuel cell incorporating a polyelectrolyte membrane separator.

With reference to FIG. 1, a schematic cross section of a fuel cell that incorporates an embodiment of a fibrous electrode sheet of Pt nanotubes is provided. Proton exchange membrane (PEM) fuel cell 10 includes polymeric ion conducting membrane 12 disposed between cathode catalyst layer 14 and anode catalyst layer 16. Fuel cell 10 also includes flow field plates 18, 20, gas channels 22 and 24, and gas diffusion layers 26 and 28. Advantageously, cathode catalyst layer 14 and/or anode catalyst layer 16 include hollow metal tubes and in particular, hollow platinum tubes as set forth below. During operation of the fuel cell, a fuel such as hydrogen is fed to the flow field plate 20 on the anode side and an oxidant such as oxygen is fed flow field plate 18 on the cathode side. Hydrogen ions generated by anode catalyst layer 16 migrate through polymeric ion conducting membrane 12 were they react at cathode catalyst layer 14 to form water. This electrochemical process generates an electric current through a load connected to flow field plates 18 and 20.

Figure 2:
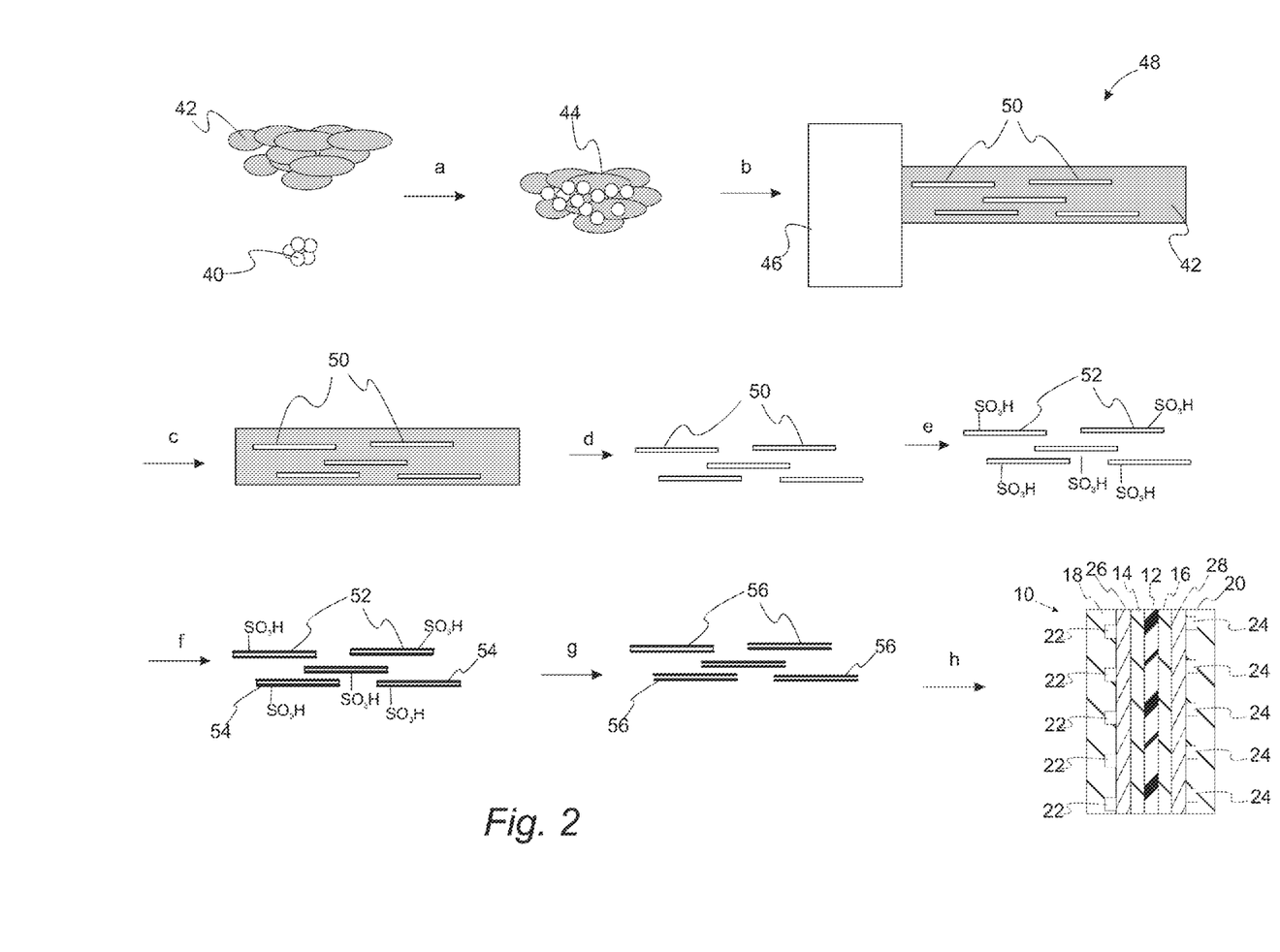
FIG. 2 is a schematic flow chart showing the fabrication of a hollow metal tubes using polyphenylene sulfide fibers as a template.

With reference to FIG. 2, a schematic flow chart illustrating a method for making hollow metal tubes is provided. In step a), polyphenylene sulfide-containing resin 40 is combined with water soluble carrier resin 42 to form resinous mixture 44. In a refinement, the weight ratio of polyphenylene sulfide-containing resin 40 to water soluble carrier resin 42 is 1:100 to about 10:1. In another refinement, the weight ratio of polyphenylene sulfide-containing resin 40 to water soluble carrier resin 42 is 1:50 to about 10:1. In still another refinement, the weight ratio of polyphenylene sulfide-containing resin 40 to water soluble carrier resin 42 is 1:10 to about 10:1. In still another refinement, the weight ratio of polyphenylene sulfide-containing resin 40 to water soluble carrier resin 42 is 1:10 to about 3:1. In still another refinement, the weight ratio of polyphenylene sulfide-containing resin 40 to water soluble carrier resin 42 is 1:10 to about 2:1. In still another refinement, the weight ratio of polyphenylene sulfide-containing resin 40 to water soluble carrier resin 42 is 1:3 to about 10:1. In step b), resinous mixture 44 is shaped. FIG. 2 depicts a particular example in which resinous mixture 44 is extruded. Therefore, resinous mixture 44 is extruded from extruder 46 in step b) to form extruded resinous mixture 48. Extruded resinous mixture 48 includes polyphenylene sulfide-containing fibers 50 within carrier resin 42. In step c), the extruded fiber is optionally separated from extruder 46. In step d), polyphenylene sulfide-containing fibers 50 are freed from the fiber by contacting/washing in water. In step e), protogenic groups (PG) are optionally added to the polyphenylene sulfide-containing fibers to form modified polyphenylene sulfide-containing fibers 52:

wherein PG is —$SO_2X$, —$PO_3H_2$, and —COX where X is an —OH, a halogen, or an ester and n is a number from about 20 to about 500 on average. In particular, the polyphenylene sulfide-containing fibers are sulfonated ($SO_3H$) in this step.

The polyphenylene sulfide containing fibers are coated with a metal layer 54 in step f). In a refinement, metal layer 54 is a catalyst-containing layer. In a refinement, metal-containing layer 54 comprises a component selected from the group consisting of gold, palladium, platinum, and combinations thereof. In particular, the metal layer is a platinum layer. Suitable film coating processes for forming the catalyst-containing layer include, but are not limited to the chemical reduction of metal ions, physical vapor deposition (PVD), plasma enhanced chemical vapor deposition (PECVD), magnetron sputtering, electron beam deposition, ion beam enhanced deposition, ion assisted deposition, chemical vapor deposition, electroplating, and the like.

In step g), metalized polyphenylene sulfide-containing fibers 50 or modified polyphenylene sulfide-containing fibers 52 with metal layer 54 are removed to leave behind the hollow metal tubes 56. Typically, the polyphenylene sulfide-containing fibers are removed by heating which is believed to cause the decomposition of the polyphenylene sulfide-containing fibers. In a refinement, the polyphenylene sulfide-containing fibers are heated to a temperature from about 80° C. to about 250° C. In another refinement, the polyphenylene sulfide-containing fibers are heated to a temperature from about 100° C. to about 200° C. In another refinement, the polyphenylene sulfide-containing fibers are heated to a temperature from about 150° C. to about 250° C. In still another refinement, the polyphenylene sulfide-containing fibers are removed by an electric current or by chemical degradation.

In step h), the hollow metal tubes are incorporated into a fuel cell component, e.g., catalyst-containing electrode layers such as cathode catalyst layer 14 and/or anode catalyst layer 16. For example, the hollow metal tubes are combined with a solvent and an optional inomer (e.g., NAFION™—a perfluorosulfonic acid polymer) and optional carbon black to form an ink. In a refinement, the ink includes from about 3 to about 70 weight percent of the hollow metal tubes. In another refinement, the ink includes from about 3 to about 65 weight percent of the hollow metal tubes. In another refinement, the ink also includes an perfluorsulfonic acid (PFSA) such as NAFION™ in an amount from about 1 to 40 weight percent. In still another refinement, the ink also includes a support material such as graphite. This ink composition is applied to a surface (e.g., an ion conducting layer or a gas diffusion layer) in a fuel cell component, and then dried. Suitable solvents include alcohols (e.g., methanol, alcohol, propanol, and the like) and water. A combination of alcohol and water is found to be particularly useful. Typically, a cathode catalyst layer 14 and/or anode catalyst layer 16 formed by this method has a thickness from about 5 microns to 5 mm.

PFSA is typically added to the Pt/C catalyst ink in electrode layer fabrication of proton exchange membrane fuel cells to provide proton conduction to the dispersed Pt nanoparticle catalyst as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

In a refinement of the present invention for the variations and embodiments set forth above, the fibers have an average cross sectional width (i.e., diameter when the fibers have a circular cross section) from about 5 nanometers to about 30 microns. In another refinement, the fibers have an average width of about 5 nanometers to about 10 microns. In still another refinement, the fibers have an average width of from about 10 nanometers to about 5 microns. In still another refinement, the fibers have an average width of from about 100 nanometers to about 5 microns. The length of the fibers typically exceeds the width. In a further refinement, the fibers produced by the process of the present embodiment have an average length from about 1 mm to about 20 mm or more.

In another refinement, the metal tubes set forth above have an average diameter from about 50 nanometers to about 10 microns. In still another refinement, the metal tubes have an average diameter from about 100 nanometers to about 300 nanometers. In yet another refinement, the metal tubes have an average wall thickness from about 10 to 50 nanometers.

The following examples illustrate the various embodiments of the present invention. Those skilled in the art will recognize many variations that are within the spirit of the present invention and scope of the claims.

Example 1

Polyphenylene sulfide (PPS) thermoplastic fibers are first created by dispersing PPS in 500,000 weight average molecular weight (MW) water soluble polymer poly(2-ethyl-2-oxazoline) (PEOX). Specifically, 5 grams of PPS is first blended in a Waring blender with 15 grams of 500,000 MW PEOX (a ratio of 1 to 3). The combined blend is added to a laboratory mixing extruder (Dynisco, LME) operated at 240° C. header and rotor temperatures with the drive motor operated at 50% of capacity, resulting in an extruded strand of the blend. This extruded strand is added to the blender to return it to granular form, and re-extruded two more times, creating a uniform extruded strand. During the final extrusion processes, the fibers are spun onto a take-up wheel (a Dynisco Take-Up System (TUS), at approximately 10 cm/second.

Figure 3A:
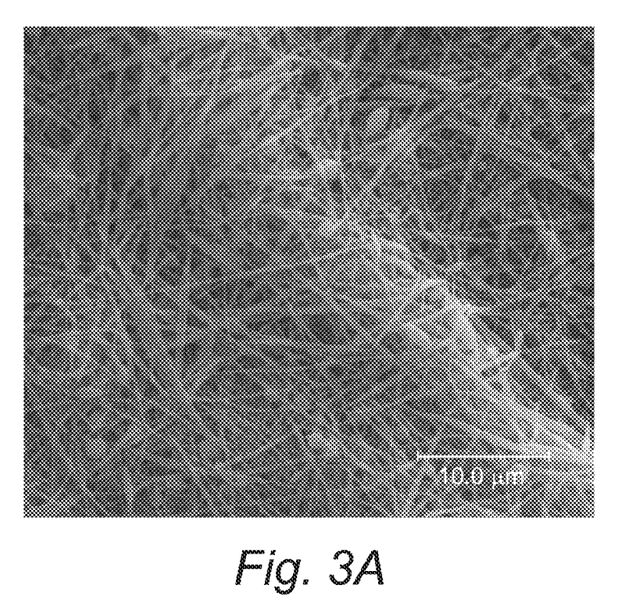
FIGS. 3A and 3B provide a micrograph of poly(phenylene sulfide) nanofibers at two different magnifications.
Figure 3B:
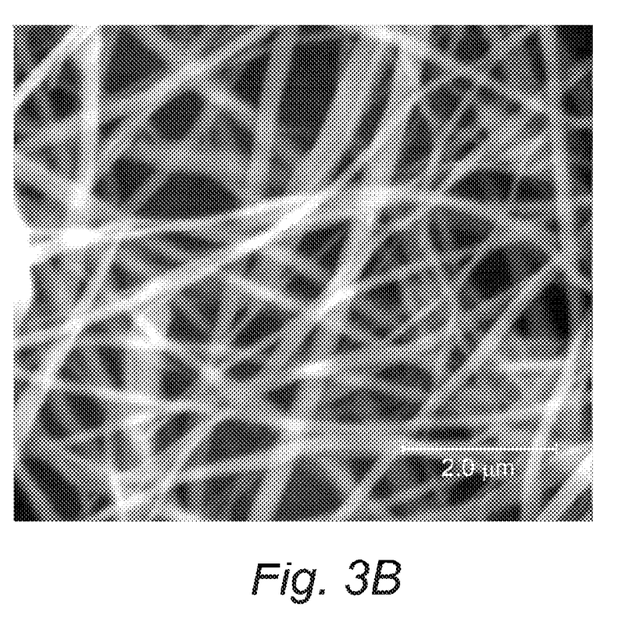

The resulting extruded strand is washed in deionized, reverse osmosis (RO) water with repeated rinses, until the PEOX has been removed, resulting in a sample of PPS nanofibers. The fibers are then rinsed in isopropyl alcohol and allowed to dry completely overnight. FIGS. 3A and 3B provide a micrograph of poly(phenylene sulfide) nanofibers at two different magnifications.

Example 2

Figure 4A:
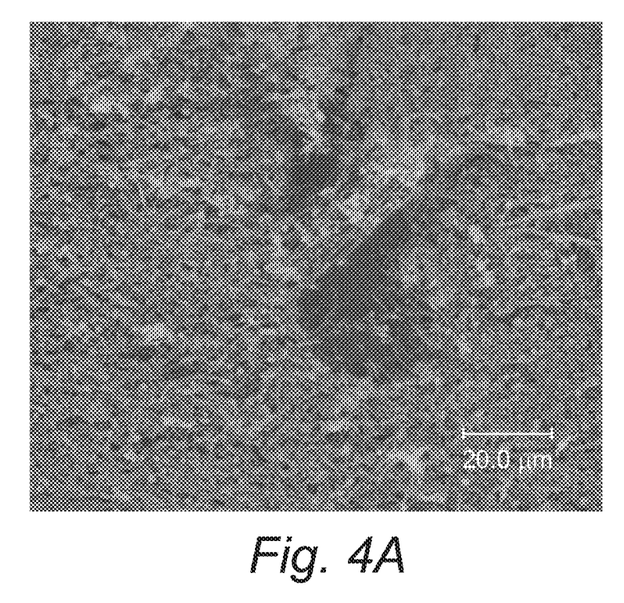
FIGS. 4A and 4B are micrographs of sulfonated poly(phenylene sulfide) at two different magnifications.
Figure 4B:
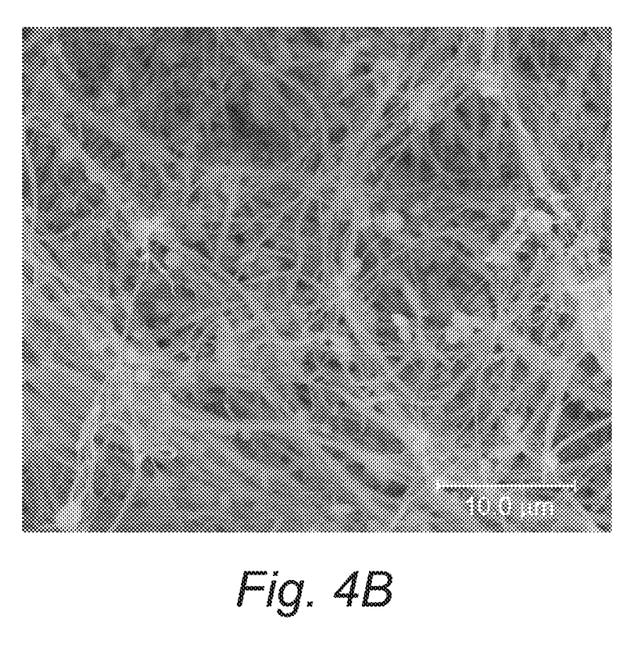

The polyphenylene sulfide nanofibers are sulfonated in a way that does not reduce the high surface area form of the PPS back to a sheet form. Nanofibers of polyphenylene sulfide (2 g, Example 1) are suspended in methylene chloride (50 g) in a screw-cap jar with a Teflon gasketed lid. Chlorosulfonic acid is first dispersed in methylene chloride (1 gram in approximately 10 g). With vigorous stirring, chlorosulfonic acid dispersion (1 g of acid) is added to the dispensation of PPS fibers in methylene chloride and the lid is secured. The jar is roll-milled for 4 hours and then the dark green-blue fibrous mixture is added to water (1 L) and is stirred for 16 hours. The sulfonated fibers are washed extensively with water and filtered onto a polypropylene mat (SeFar America). The ion exchange capacity of the fibers is 1.03 meq $H^+$/g. The reaction is repeated using two grams of chlorosulfonic acid and two grams of nanofibers of polyphenylene sulfide. The ion exchange capacity of the resultant fibers is 1.3 meq $H^+$/g. The resulting fibers of polyphenylene sulfide with sulfonic acid groups is referred to as PPS—S fibers. FIGS. 4A and 4B are micrographs of sulfonated polyphenylene sulfide at two different magnifications.

Example 3

Figure 5A:
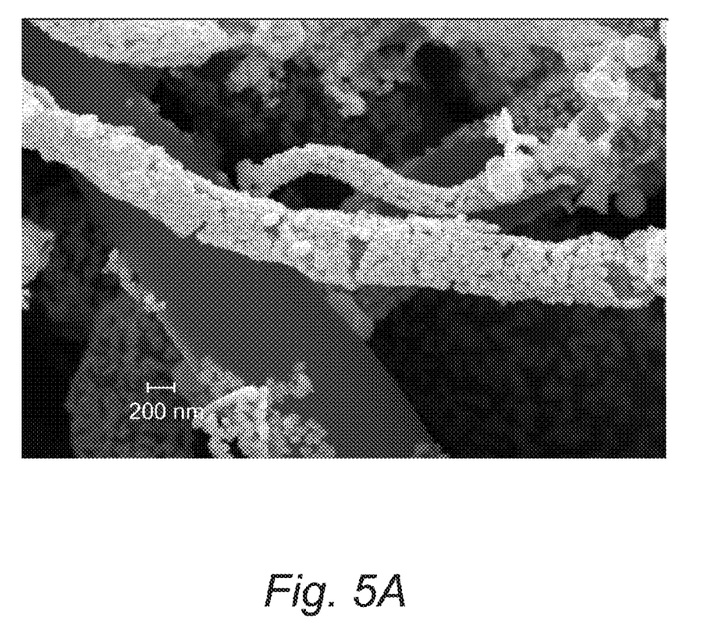
FIGS. 5A and 5B provide micrographs of platinum metalized sulfonated poly(phenylene sulfide) nanofibers at two different magnifications.
Figure 5B:
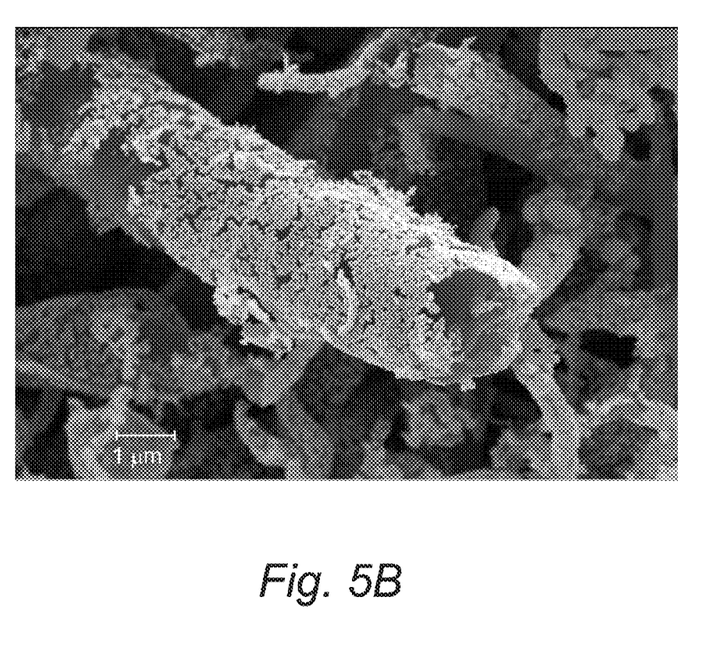

A catalytic layer is added to the sulfonated nanofibers. In the following example, platinum salt is reduced to metallic platinum on the surface of the PPS—S fibers. Polyphenylene sulfide nanofibers (1 g), previously modified with the addition of sulfonic acid groups in 0.1 N sodium hydroxide (100 mL) are treated with diaminedinitroplatinum(II) as a 3.4 wt. % solution in dilute ammonium hydroxide [Aldrich, 47.4 mL solution, 48.42 g solution, 1.646 g diaminedinitroplatinum (II), 0.005126 mol diaminedinitroplatinum(II)]. To this mixture is added 100 mL of 15 wt. % sodium borohydride (Aldrich) in 0.1 N sodium hydroxide. After heating at 60° C. for 4 hours with stirring, the mixture is allowed to stir for 16 h at 23° C. The black nanofibers are isolated by filtration, washed with 1 N HCl, washed with isopropanol, and air dried. These metalized nanofibers are useful as fuel cell catalysts (and as electron conducting media in fuel cells). FIGS. 5A and 5B provide micrographs of metalized polyphenylene sulfide nanofibers at two different magnifications.

Figure 6A:
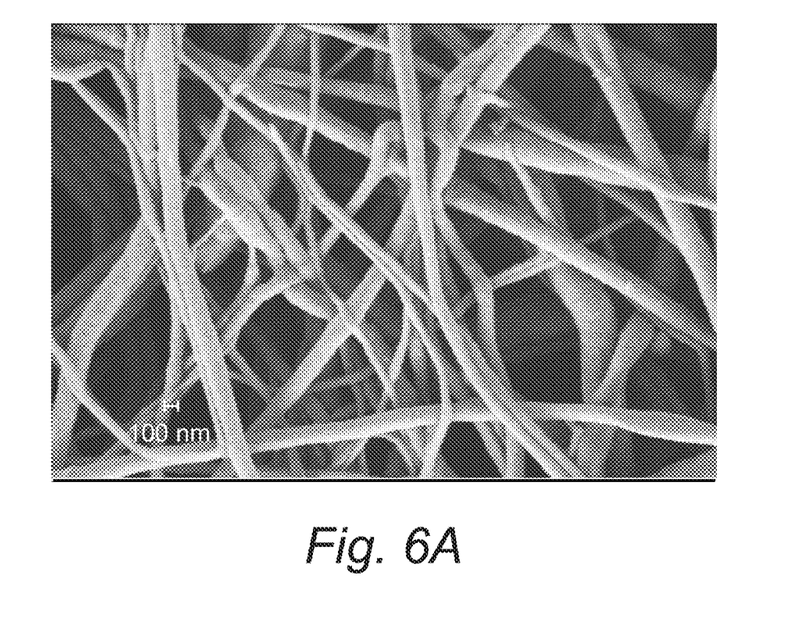
FIGS. 6A and 6B provide micrographs of gold-palladium metalized poly(phenylene sulfide) nanofibers at two different magnifications.
Figure 6B:
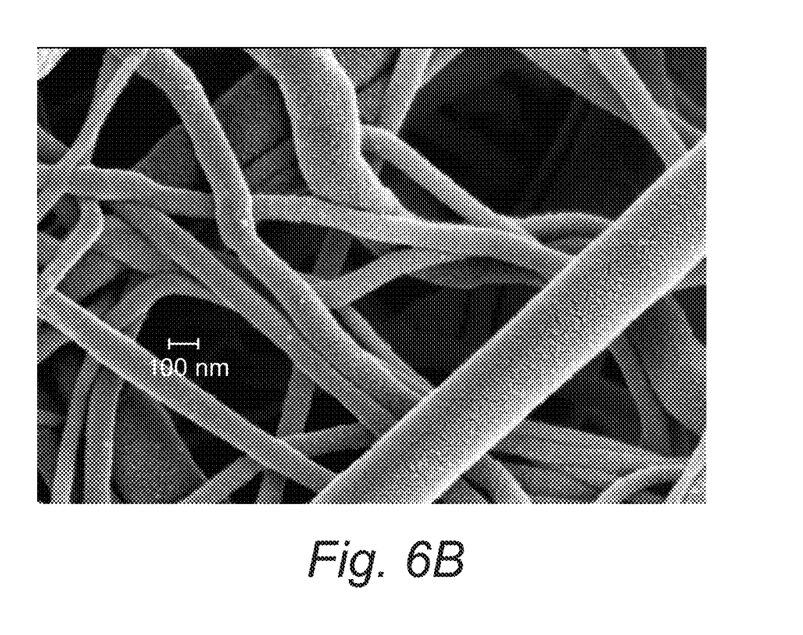
Figure 7A:
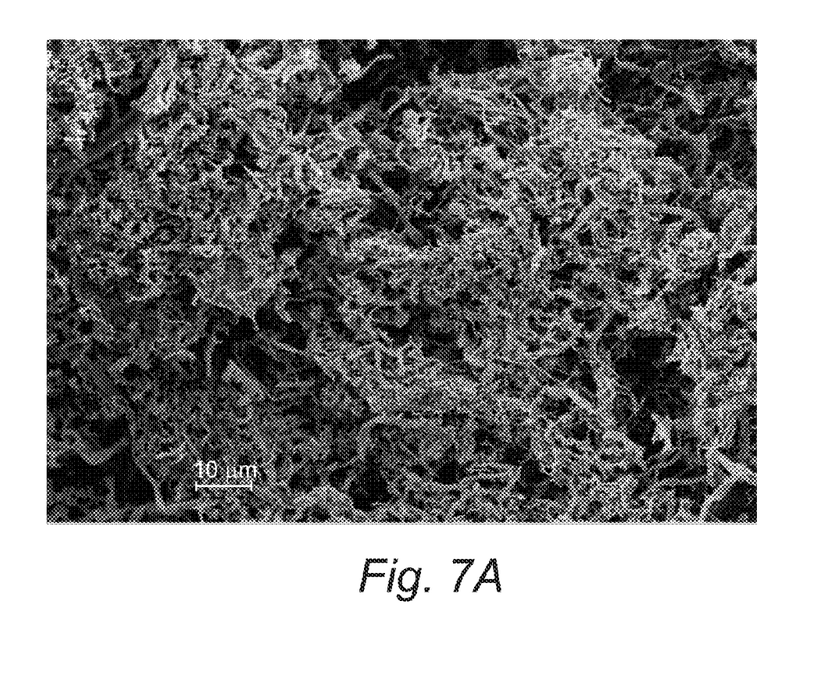
FIGS. 7A-D provide micrographs of hollow platinum tubes at four different magnifications.
Figure 7B:
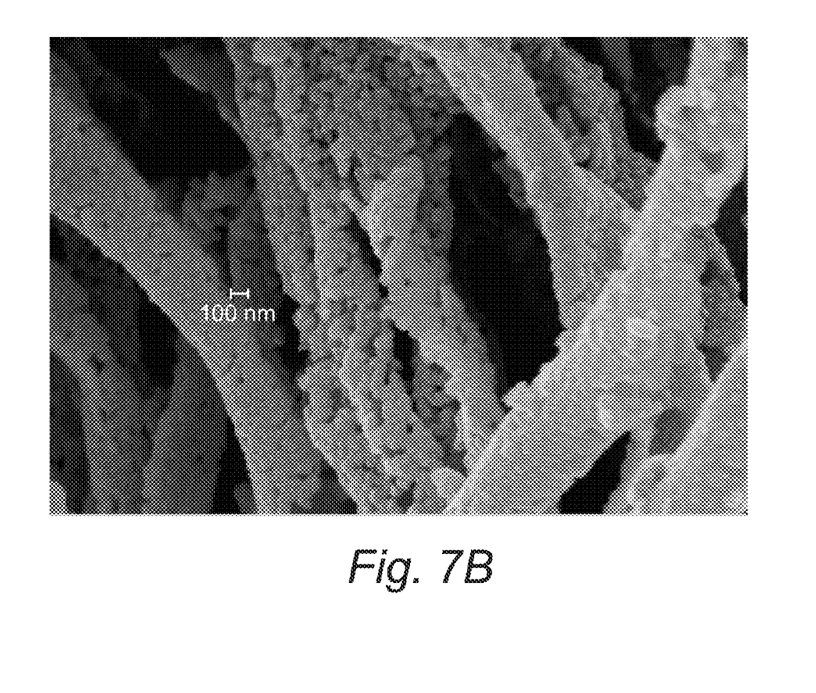
Figure 7C:
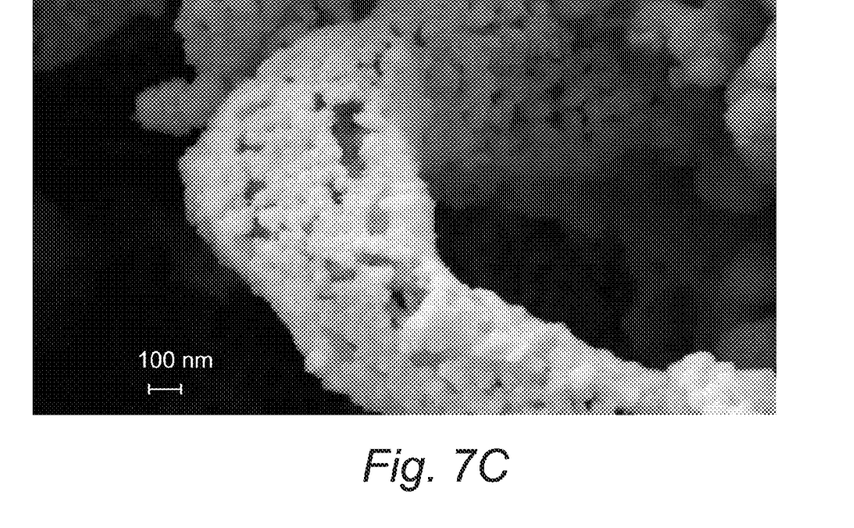
Figure 7D:
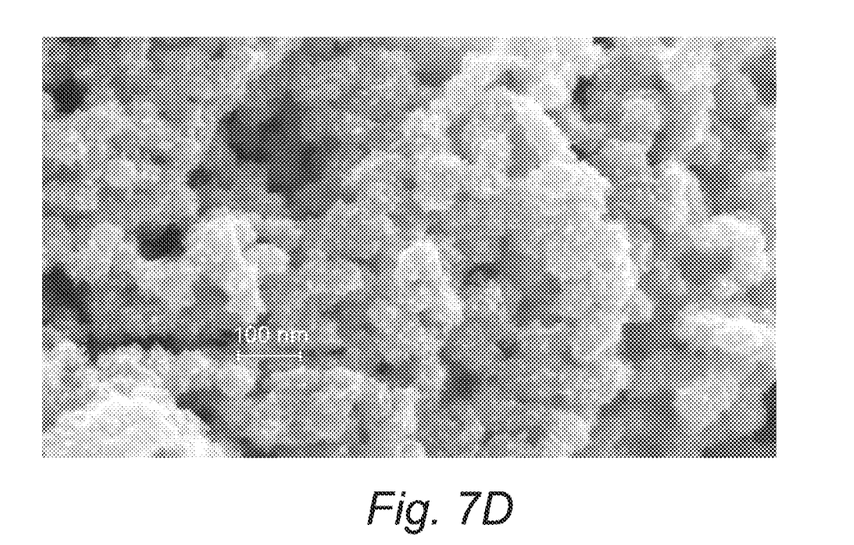

FIGS. 6A and 6B provide micrographs of metalized polyphenylene sulfide nanofibers at two different magnifications. In these figures, the metalized polyphenylene sulfide nanofibers are coated with gold-palladium by sputter coating.

Example 4

Samples of platinum coated nanofibers are placed in a furnace in a glass vial. The samples are heated to 110° C. and held for one hour. The samples are then heated to 180 C for one hour. The samples are cooled and then removed as a mat of hollow metal nanotubes.

Example 5

Samples of platinum coated nanofibers are placed in a furnace in a glass vial. The samples are then heated to 200° C. for two hours. The samples are cooled and then removed as a mat of hollow platinum nanotubes.

FIGS. 7A-D provide scanning electron micrographs for the hollow platinum nanotubes at four different magnifications. The platinum tubes have diameters from 100 to 300 nm and are observed to have dramatic amounts of surface area. In addition, the tubes have double the wall surface area (i.e., inner and outer).

Others polymers such as polystyrene and sulfonated polystyrene can be considered as alternatives to PPS and PPS—S in the provided examples. PPS and PPS—S offer the advantages of easy nanofiber preparation by the described methods.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    combining a polyphenylene sulfide-containing resin with a water soluble carrier resin to form a resinous mixture;
    extruding the resinous mixture to form an extruded resinous mixture, the extruded resinous mixture having polyphenylene sulfide-containing fibers within the carrier resin;
    contacting the extruded resinous mixture with water to separate the polyphenylene sulfide-containing fibers from the carrier resin;
    coating the polyphenylene sulfide-containing fibers with a metal layer; and
    forming hollow metal tubes by removing the polyphenylene sulfide-containing fibers.

2. The method of claim 1 wherein the metal layer includes a component selected from the group consisting of gold, platinum, palladium, and combinations thereof.

3. The method of claim 1 wherein polyphenylene sulfide-containing fibers are removed by heating.

4. The method of claim 3 wherein polyphenylene sulfide-containing fibers are heated to a temperature from about 80° C. to about 250° C.

5. The method of claim 3 wherein polyphenylene sulfide-containing fibers are heated to a temperature from about 100° C. to about 200° C.

6. The method of claim 1 wherein a protogenic group is added the polyphenylene sulfide-containing fibers prior to coating with the metal layer.

7. The method of claim 6 wherein the protogenic groups are $SO_2X$, $-PO_3H_2$, or $-COX$ where X is an $-OH$, a halogen, or an ester.

8. The method of claim 1 wherein the carrier resin is a water-soluble polyamide.

9. The method of claim 1 wherein the carrier resin comprises poly(2-ethyl-2-oxazoline).

10. The method of claim 1 wherein the weight ratio of polyphenylene sulfide-containing resin to carrier resin is from about 1:100 to about 10:1.

11. The method of claim 1 wherein the metal tube has a diameter from about 50 nanometers to about 10 microns.

12. The method of claim 1 wherein the metal tube has a diameter from about 100 nanometers to about 300 nanometers.

13. The method of claim 1 wherein the metal tubes have an average wall thickness from about 10 to 50 nanometers.

14. A method comprising:
    combining a polyphenylene sulfide-containing resin with a water soluble carrier resin to form a resinous mixture;
    extruding the resinous mixture to form an extruded resinous mixture, the extruded resinous mixture having polyphenylene sulfide-containing fibers within the carrier resin;
    contacting the extruded resinous mixture with water to separate the polyphenylene sulfide-containing fibers from the carrier resin;
    coating the polyphenylene sulfide-containing fibers with a platinum layer; and
    forming a hollow platinum tube by removing the polyphenylene sulfide-containing fibers.

15. The method of claim 14 wherein polyphenylene sulfide-containing fibers are removed by heating.

16. The method of claim 15 wherein polyphenylene sulfide-containing fibers are heated to a temperature from about 80° C. to about 250° C.

17. The method of claim 15 wherein polyphenylene sulfide-containing fibers are heated to a temperature from about 100° C. to about 200° C.

18. The method of claim 14 wherein the carrier resin is a water-soluble polyamide.

19. The method of claim 14 wherein the carrier resin comprises poly(2-ethyl-2-oxazoline).

20. The method of claim 14 wherein the hollow platinum tube has an average diameter from about 100 nanometers to about 300 nanometers and an average wall thickness from about 10 to 50 nanometers.

* * * * *